United States Patent
Jakobi et al.

(10) Patent No.: US 8,146,226 B2
(45) Date of Patent: Apr. 3, 2012

(54) METHOD FOR ATTACHING GUIDE MEANS TO A FLEXIBLE SHEET-LIKE STRUCTURE AND PREPARATORY DEVICE THEREFOR

(75) Inventors: Manfred Jakobi, Schlotheim (DE); Guenter Renz, Ditzingen (DE); Wolfgang Stark, Denkendorf (DE); Karl-Heinz Winter, Waiblingen (DE)

(73) Assignee: Bos GmbH & Co., KG, Ostfildern (DE)

( * ) Notice: Subject to any disclaimer, the term of this patent is extended or adjusted under 35 U.S.C. 154(b) by 895 days.

(21) Appl. No.: 12/229,246

(22) Filed: Aug. 21, 2008

(65) Prior Publication Data

US 2009/0056100 A1    Mar. 5, 2009

(30) Foreign Application Priority Data

Aug. 29, 2007  (DE) .................... 10 2007 042 196

(51) Int. Cl.
*B23P 11/00* (2006.01)
(52) U.S. Cl. ............................ 29/428; 29/446; 29/897.2
(58) Field of Classification Search .................... 29/428, 29/446, 897.2
See application file for complete search history.

(56) References Cited

U.S. PATENT DOCUMENTS

| | | | | |
|---|---|---|---|---|
| 2,893,162 A | * | 7/1959 | Knowles | 38/102.1 |
| 4,660,308 A | * | 4/1987 | Dang et al. | 38/102.4 |
| 5,937,751 A | * | 8/1999 | Newman, Jr. | 101/127.1 |
| 6,161,893 A | * | 12/2000 | Ewing et al. | 296/152 |
| 6,439,646 B1 | * | 8/2002 | Cornelius | 296/164 |
| 6,493,968 B2 | * | 12/2002 | Chinitz | 38/102.91 |
| 6,662,849 B1 | * | 12/2003 | Hsiung | 160/122 |
| 2005/0077017 A1 | | 4/2005 | Ramsey | |

FOREIGN PATENT DOCUMENTS

| | | |
|---|---|---|
| DE | 102 53 816 B3 | 2/2004 |
| DE | 103 06 629 A1 | 8/2004 |
| DE | 10 2005 038 373 A1 | 2/2007 |
| DE | 20 2006 015 107 U1 | 2/2007 |

OTHER PUBLICATIONS

Office Action of German Patent Office dated Apr. 8, 2008 (3 pages).

* cited by examiner

*Primary Examiner* — Derris Banks
*Assistant Examiner* — Azm Parvez
(74) *Attorney, Agent, or Firm* — Flynn, Thiel, Boutell & Tanis, P.C.

(57) ABSTRACT

The invention relates to a method for attaching guide means (106) to a flexible sheet (100), preferably as part of a shading system for a vehicle, and to a device provided therefor. Holding regions (102a, 102b), spaced apart from one another in a Y-direction, of a flexible sheet (100) extending in an X-direction and a Y-direction are spaced apart from one another by being acted upon with a predetermined pretensioning force ($F_y$) acting in the Y-direction, with the result that a pretension state is achieved. Subsequently, in a further processing state which corresponds to the pretension state or to a pretension state relieved by the amount of a predetermined relief distance ($S_3$) in the Y-direction with respect to the pretension state, guide means (106) extending parallel to one another in the X-direction and spaced apart from one another in the Y-direction are fastened to the sheet (100).

4 Claims, 3 Drawing Sheets

METHOD FOR ATTACHING GUIDE MEANS TO A FLEXIBLE SHEET-LIKE STRUCTURE AND PREPARATORY DEVICE THEREFOR

FIELD OF THE INVENTION

The invention relates to a method for attaching guide means to a flexible sheet-like structure, preferably as part of a shading system for a vehicle. The invention relates, furthermore, to a device for preparing a flexible sheet-like structure for the attachment of guide means within the framework of the production of such a system, in particular a shading system for a vehicle.

BACKGROUND OF THE INVENTION

Roller blind systems with flexible sheet-like structures are used in vehicles for various purposes. In addition to loading space coverings and separation nettings, in particular, shading systems can be formed, with sheet-like structures which are extendable in the manner of a roller blind and which can be brought occasionally or permanently into a state in which they span individual window areas or, for example, even an open roof. In one possible form of securing of such sheet-like structures in their extended operating state, the sheet-like structures are secured in a tensioned state in the vehicle on both sides, this securing preferably allowing a displacement of the sheet-like structure in the direction of orientation of the securing means. In such a configuration, the sheet-like structures are usually inserted in a pretensioned state into the vehicle, the pretension being dimensioned in such a way that the sheet-like structures do not sag to a disturbing extent even under aging-induced and environmentally induced influences.

To produce such a sheet-like structure which is inserted in the vehicle under pretension, the guide means on the sides of the sheet-like structure are usually spaced apart from one another to a lesser extent than the corresponding guide means fixed to the vehicle. The result of this is that a pretension is generated during insertion into the vehicle as a result of the forced stretching.

A disadvantage of the usual procedure, in which the spacing of the guide means on the sheet-like structure is lower in relation to the spacing of the guide means fixed to the vehicle, is considered to be that this procedure may lead to different results, depending on the material from which the flexible sheet-like structure is produced. Although the guide means on the sheet-like structure, in the untensioned state, are always fastened to the sheet-like structure at the same spacing with respect to one another, the tension force in the inserted state is not uniform, but is partly too high and partly too low.

SUMMARY OF THE INVENTION

The object of the invention is to make available a method and a device for carrying it out, which mitigate or eliminate the disadvantages arising from the prior art.

According to the invention, this is achieved, with regard to the method, in that holding regions, spaced apart from one another in a Y-direction, of the flexible sheet-like structure extending in the X-direction and Y-direction are spaced apart from one another by being acted upon with a predetermined pretensioning force acting in the Y-direction, with the result that a pretension state is achieved. Subsequently, in a further-processing state, which corresponds to the pretension state or to a pretension state relieved in the Y-direction with respect to the pretension state by the amount of a preferably predetermined relief distance, in particular, guide means extending parallel to one another in the X-direction and spaced apart from one another in the Y-direction are fastened to the sheet-like structure.

As a result of the pretensioning force acting in the Y-direction, the sheet-like structure is consequently stretched, a state already being produced which corresponds approximately to the later installation situation in the vehicle. The pretensioning force therefore preferably corresponds to the tension force in the sheet-like structure which prevails in the vehicle. The stretching distance by which the sheet-like structure is stretched for this purpose is not permanently predetermined. It arises as a function of the nature of the sheet-like structure, that is to say, in particular, of its modulus of elasticity, and as a function of the pretensioning force applied.

After the pretension state has been reached, this is then followed, in the tensioned state, by the fastening of the guide means at a predetermined spacing with respect to one another, preferably at a spacing which corresponds to the spacing in the installation situation in the vehicle or which is reduced with respect to this by the amount of the relief distance. In the simplest instance, this may take place in a further-processing state which corresponds to the pretension state previously reached. It is particularly preferred, however, if this further-processing state deviates from the pretension state insofar as it is relieved by the amount of a preferably predetermined relief distance. In this variant, therefore, the spacing of the holding regions which arises in the pretension state as a function of the above-mentioned subsidiary factors is reduced by the amount of the relief distance. This relief is advantageous, since, in the reduced tension state, a fastening of the guide means to the sheet-like structure is possible more easily and with higher quality, depending on the type of fastening. This applies particularly when the fastening takes place by means of an adhesive connection, since, in such a case, it is possible, due to the relief, to glue the guide means in a less tensioned state of the sheet-like structure, this being beneficial to the durability of the adhesive connection. In addition to fastening by adhesive bonding, however, other fastening methods may also be used. For example, the guide means may be fastened to the flexible sheet-like structure by stitching or by means of rivets.

A predetermined force or a predetermined distance is understood, in connection with this invention, to mean a force or a distance which is always uniform during the process of treating sheet-like structures of the same type. The predetermined forces or distances are therefore not adapted as a function of specific properties of the sheet-like structure.

The guide means themselves may be designed in the most diverse possible ways. Their essential property is that they can cooperate with guide means fixed to the vehicle, in such a way that they secure a marginal region of the sheet-like structure fixedly to the vehicle. Thus, for example, the guide means may comprise two guide strips, one of the guide strips being inserted into a guide grove fixed to the vehicle on the right side of the region to be spanned and one of the guide strips being so inserted on the left side of said region.

The method is preferably carried out as a discrete method, in which a sheet-like structure limited in the X-direction is acted upon over its entire length in the Y-direction with a largely uniform pretensioning force. The length of this sheet-like structure in the X-direction preferably corresponds to the length of the sheet-like structure for an individual vehicle. It is also conceivable, however, that the selected length is sufficiently large for several vehicles, and that the sheet-like structure is subdivided into smaller portions in the X-direction only after the fastening of the guide means. In addition to this form of the method as a discrete method, embodiments as a continuous or partly discrete method are also possible. When the method is carried out as a continuous method, the sheet-like structure is a sheet-like structure initially not limited in the X-direction, that is to say an endless sheet-like structure. This, when it runs continuously through a device suitable for carrying out the method, is first pretensioned with the predetermined pretensioning force and is then provided further on with the guide means. Thus, whereas, in the embodiment as a purely continuous method, the guide means are applied as endless guide means, in a partly discrete method they are applied in portions which preferably correspond to the length of the portions required for a vehicle.

In a development of the method, in an additional step before the step of action by the predetermined pretensioning force, the flexible sheet-like structure is acted upon in the Y-direction with an overstretching force which is higher than the pretensioning force. This overstretching force ensures that faults in the sheet-like textile structure which are caused by manufacture and by transport are removed. As a result of the overstretching force, in particular, the meshes of sheet-like textile structures are drawn apart and any loops and the like still located in the fabric are pulled straight. By means of the overstretching force, therefore, a particularly uniform initial situation for the subsequent steps is afforded. Action by the overstretching force preferably takes place by the same means which are also responsible, later on in the method, for action by the pretensioning force. This development of the method is therefore cost-effective in terms of the device and requires no great extra outlay.

In a development of the method, when being acted upon by the pretensioning force, the sheet-like structure is held in the region of the holding regions in each case by a holding means, these holding means being part of a common holding device which can be handled separately. In this case, before action by the pretensioning force, the sheet-like structure is introduced into the holding device and the holding means are put into a holding state. Furthermore, before action by the pretensioning force, the holding device is placed on a loading device designed for applying the pretensioning force and is preferably coupled to this. This development of the method makes it possible to carry out the method in a way which is particularly advantageous in terms of the outlay. The holding device, which is formed separately from the loading device and is coupled to this merely as the case arises, may also be used in interaction with other devices as the loading device in subsequent method steps within the framework of the production or secondary treatment of the sheet-like structure. The introduction of the sheet-like structure into the holding device does not necessarily take place before the holding device is placed onto the loading device. It is likewise also conceivable, and covered by this development, that the holding device is first connected to the loading device or coupled to this and the introduction of the sheet-like structure takes place only thereafter.

The placing of the holding device onto the loading device is to be understood as meaning a connection of the holding device to the loading device which secures the holding device to the loading device at least inasmuch as the holding means follow the movement of the loading device when a load is exerted by the loading device and presses the holding means onto one another. It is particularly preferable, however, if the holding device is not only placed onto the loading device, but is also coupled to this, coupling being considered to be securing the holding device to the loading device which makes a connection between the loading device and holding device at least in a direction deviating from the Y-direction. In particular, this may take place by means of holding claws, connecting pins or similar connection means which, after the holding device has been placed onto the loading device, are pivoted or displaced in such a way that they couple the holding device positively to the loading device.

A development of the method is particularly preferred in which, after the further processing state is reached, the spacing of the holding means is fixed by fixing means which are different from the force-applying means for achieving the pretension state. These fixing means make it possible to fix the further processing state, without the force-applying means having to continue to remain in their tension state for this purpose. Particularly in an embodiment in which the force-applying means are part of a loading device, what can be achieved by additional fixing means is that the holding device can be decoupled from the loading device by the fixing means, without the further processing state produced being lost as a result.

In a development of the method, said separation of the holding device from the loading device takes place after the further processing state is reached. This makes it possible, on the one hand, to release the loading device immediately for the next sheet-like structure to be pretensioned into the pretension state and, on the other hand, to further process sheet-like structures brought into the further processing state, at a next workstation, in particular to provide it with the guide means.

Particularly for carrying out the method described above, the invention relates, furthermore, to the generic device, described above, for preparing a flexible sheet-like structure. This device comprises, according to the invention, two holding arrangements which are designed for securing a sheet-like structure extending in an X-direction and a Y-direction, the holding arrangements being spaced in the Y-direction in such a way that the sheet-like structure can be secured by them at two parallel marginal regions lying opposite one another. The device comprises, furthermore, loading means, by which the spacing of the two holding arrangements with respect to one another can be varied at least in portions.

The device according to the invention therefore makes it possible, for the purpose of producing, for example, a shading system, first to secure the sheet-like structure in an untensioned state in the parallel marginal regions and then to space these marginal regions apart from one another so that a pretension is generated in the flexible sheet-like structure in the Y-direction. The holding arrangements are in this case preferably designed as clamping arrangements which can be opened and closed in an uncomplicated way and thus allow a rapid tension mounting and tension demounting of the sheet-like structure. The loading means are configured such that they can apply a predetermined stretching force. They are in this case suitable for applying this stretching force independently of the travel covered, so that the sheet-like structure is tensioned until this stretching force is reached. It thereby makes it possible, after this stretching force is predetermined, to stretch the sheet-like structure until the tension in the sheet-like structure reaches the predetermined stretching force. The holding arrangements, which are preferably designed for clamping the sheet-like structure, preferably extend continuously in the X-direction, so that the sheet-like structure is held linearly in the marginal regions over a longer distance, for example at least 200 mm. Alternatively to this, the holding arrangements may also be designed for only punctiform holding, in which case each holding arrangement is assigned holding points spaced apart in the X-direction, preferably holding points which are spaced apart from one another at most by 200 mm, preferably at most by 100 mm, at least three such holding points being provided in alignment with one another for each holding arrangement.

It is particularly preferable if the device has fixing means, by which a spacing of the holding arrangements can be fixed variably. This variable fixing by the fixing means makes it possible, after reaching a spacing of the holding arrangements which is established at the predetermined stretching force and is not predetermined, to preserve this state. If such fixing means are present, the loading means can be released after their fixing, without the spacing state of the holding arrangements which has been reached being lost as a result. In particular, the fixing means make it possible to separate the holding arrangements from the loading means after the desired spacing is reached.

In a particularly preferred embodiment of the device, this has at least two subassemblies connectable to and separable from one another during the intended use of the device, a frame subassembly comprising the holding arrangements and preferably the fixing means, and a basic subassembly comprising the loading means. This separation into various subassemblies allows a particularly flexible use. The separation into said subassemblies according to this development is to be understood as meaning that the frame subassembly and the basic subassembly are designed such that they can be connected and separated, within the framework of the intended use, for the treatment of a sheet-like structure. They are in this case coordinated with one another in such a way that a connection between the subassemblies can be made preferably simply by putting in place or at least tool-free connection, by virtue of which connection it is possible to transmit to the holding arrangements spacing forces which are exerted by the loading means.

It is particularly preferable, in this case, that the basic subassembly and the frame subassembly are coordinated with one another in such a way that the frame subassembly can be connected to the basic subassembly positively with respect to the Y-direction by being placed onto the basic subassembly in a direction deviating from the Y-direction. A rapid change of the frame subassembly is thereby possible, since, as a result, the frame subassembly can be separated from the basic subassembly simply by being raised, and another frame subassembly or the same frame subassembly can subsequently be connected to the basic subassembly simply by being put in place. A connection, positive in the Y-direction, is Considered in this case to be a connection such that action upon the holding arrangements with force by the loading means is possible immediately after the frame subassembly has been placed onto the basic subassembly. Preferably, the connection, positive in the Y-direction, is effective on two sides, so that both a shortening of the spacing between the holding arrangements and an enlargement of the spacing between holding arrangements are possible reliably and reproducibly by the loading means.

In a development of the invention, coupling means are provided, by which the frame subassembly can be coupled to the basic subassembly. These coupling means are understood to mean connection means which make connection not only in the Y-direction, but preferably in all three spatial directions, but at least connect the frame subassembly to the basic subassembly in the X-direction and Y-direction. Even if a configuration in which it is sufficient merely to put the frame subassembly in place is conceivable and may be expedient in the way described above, an increased degree of safety can be achieved by additional connection by the coupling means.

In a development of the invention, the fixing means are designed in such a way that they are unlocked automatically when the frame subassembly is connected to the basic subassembly. As a result of this automatic unlocking, the fixing means are immediately returned to a state which they should assume before action with force by the loading means. Separate unlocking may therefore be dispensed with.

It is preferable that the fixing means are designed as pressure-controlled fixing means, control means for controlling the prevailing media pressure preferably being arranged in the basic subassembly. The configuration of the fixing means as pressure-controlled fixing means makes it possible to have a particularly simple configuration. The pressure applied for controlling the fixing means is preferably fed from an external source. A control of a hydraulic or pneumatic type is particularly preferred. In particular, it is expedient if the fixing means are designed in such a way that they assume a fixing state when the media pressure is low or zero and assume a released state when the media pressure is high. This makes it possible to configure the fixing means such that there is no need for pressure to prevail when the frame subassembly is separated from the basic subassembly. Preferably, control means for controlling the media pressure are additionally provided in the basic subassembly and make it possible to lower the media pressure after the further processing state is reached and consequently to produce the fixing state.

In a development of the invention, an odometer and/or a dynamometer are/is provided, the odometer being designed for measuring the spacing of the two holding arrangements, and the dynamometer being designed for measuring the force acting in the Y-direction on the sheet-like structure. While the intended function of the device can be ensured even by the loading means being activated merely by control and therefore without a closed loop, an additional dynamometer can provide a closed loop, by means of which a particularly reproducible type of force action is possible. In particular, in such a case, the loading means can be designed in a very simple way, since they do not have to be suitable directly for producing the predetermined pretensioning force, but, instead, it is sufficient that they can implement a variable spacing of the holding arrangements. This spacing can then be increased as a function of the prevailing force until the prevailing force corresponds to the predetermined pretensioning force. The provision of an odometer is advantageous particularly so that the tension-mounted sheet-like structure can be tension-demounted by the amount of a predetermined distance after the predetermined pretension is reached. For this purpose, the spacing is recorded when the predetermined pretension is reached. The force applied by the loading means is subsequently reduced until this spacing has been reduced by the amount of a predetermined relief distance.

To control the device, a control apparatus is preferably provided which is designed to emit output signals and/or to receive input signals which are necessary for carrying out the method described above.

BRIEF DESCRIPTION OF THE DRAWINGS

Further features and advantages of the invention may be gathered not only from the claims, but also from the following description of a preferred exemplary embodiment of the invention. This exemplary embodiment is illustrated by means of various stages in carrying out the method according to the invention. In the drawings:

DETAILED DESCRIPTION OF THE EXEMPLARY EMBODIMENT

Figure 2:
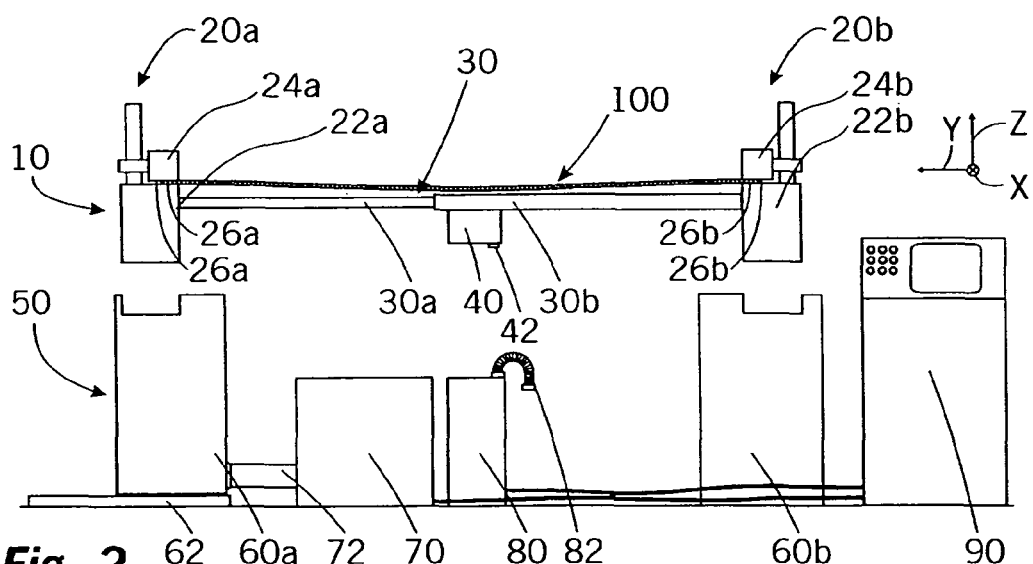
FIG. 2 shows the frame subassembly of FIG. 1 with a tension-mounted sheet-like structure before insertion into a basic subassembly.

Before the method sequence is described, the individual components of the device which are necessary for carrying out the method will be explained first with reference to FIG. 2.

The device consists of two subassemblies, a frame subassembly 10 and a basic subassembly 50. The frame subassembly 10 has two holding arrangements 20a, 20b which extend parallel to one another and which in each case extend in the X-direction and in each case have a clamping beam 22a, 22b and a clamping strip 24a, 24b displaceable in the Z-direction with respect to the clamping beam 22a, 22b. The clamping beams 22a, 22b and the clamping rails 24a, 24b assigned in each case likewise extend in the X-direction and in each case have clamping surfaces 26a, 26b directed toward one another. The holding arrangements 20a, 20b are connected to one another via connecting tube devices 30 extending in the Y-direction. The connecting tube devices 30 consist in each case of telescopic tubes 30a, 30b and make it possible to have a variable spacing of the holding arrangements from one another, any desired spacing state previously reached being fixable by means of a compressed air brake 40.

The basic device 50 has two bearing blocks 60a, 60b which are designed for receiving the holding arrangements 20a, 20b. While the right bearing block 60b stands fixedly on a factory building floor, the left bearing block 60a is designed to be displaceable in the Y-direction. For this purpose, on the factory building floor, a bearing plate 62 is arranged which, together with an underside of the bearing block 60a, forms a linear bearing in a way not illustrated in any more detail. To control the position of the bearing block 60a, a fixed loading device 70 is provided, which is connected to the bearing block 60a via a linkage 72. This linkage 72 can be moved in translation in a Y-direction via the loading device 70, with the result that a movement of the bearing block 60a can be brought about.

The basic subassembly 50 has as further components a compressed air source 80 which is connectable via a hose 82 to the compressed air brake 40 of the frame subassembly. Furthermore, a control apparatus 90 is provided, which, inter alia, assumes the control of the compressed air source 80 and of the loading device 70.

Figure 1:
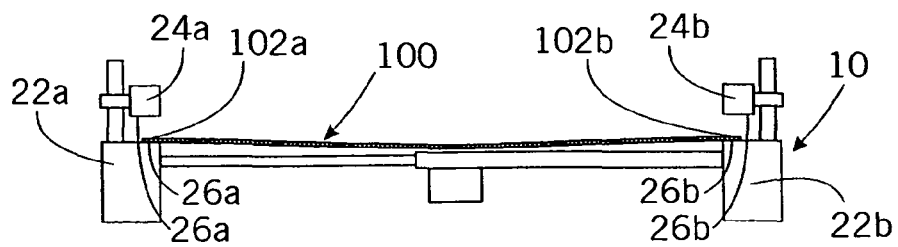
FIG. 1 shows a frame subassembly and a flexible sheet-like structure capable of being tension-mounted in the frame subassembly.

With regard to the method sequence: as illustrated in FIG. 1, a sheet-like structure 100 extending in the X-direction and Y-direction is first introduced into the frame subassembly 10 still separate from the basic subassembly at this time point, so that it extends into the region of the clamping surfaces 26a, 26b of the holding arrangements 20a, 20b. The clamping rails 24a, 24b are subsequently lowered, so that the margins 102a, 102b of the sheet-like structure 100 are tensioned firmly between the clamping surfaces 26a, 26b of the clamping beams 22a, 22b and the clamping rails 24a, 24b. At this time point, the sheet-like structure 100 is still in an untensioned state. This is the state which is illustrated in FIG. 2.

Figure 3:
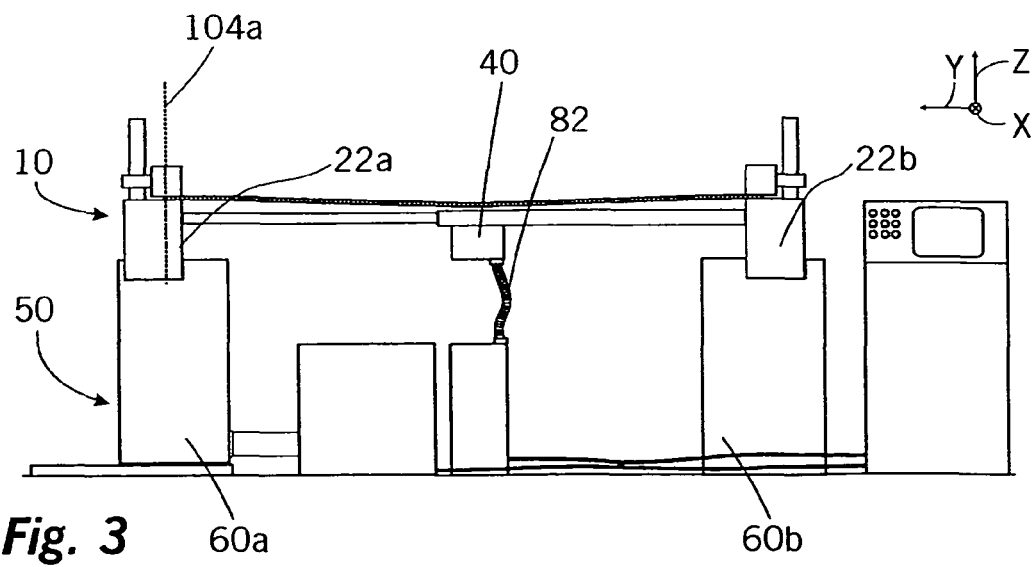
FIG. 3 shows an initial position after the insertion of the frame subassembly into the basic subassembly.

In this state, the overall frame subassembly 10, together with the sheet-like structure 100, is inserted into the basic subassembly 50, so that the clamping beams 22a, 22b are in each case fixed positively in the Y-direction in the bearing blocks 60a, 60b. The compressed air hose 82 is subsequently connected to the compressed air brake 40 which, for this purpose, offers a connecting device 42 on its underside. The state thereby reached is illustrated in FIG. 3. For better understanding of the following step, the position 104a of the left edge of the sheet-like structure 100 is identified in this state in FIG. 3.

Figure 4:
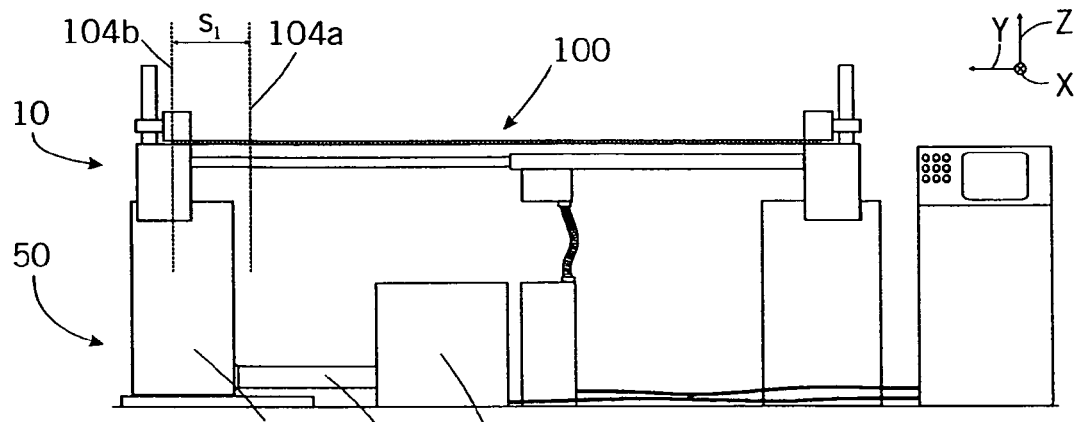
FIG. 4 shows the overall device after an overstretching state has been produced in the sheet-like structure.

Starting from the state of FIG. 3, in which the basic subassembly 50 and the frame subassembly 10 are in a coupled state with respect to the Y-direction, a displacement of the left bearing block 60a is carried out, as illustrated in FIG. 4. For this purpose, the linkage 72 is moved continuously out of the loading device 70, and this may take place either up to a predetermined overstretching position or up to a predetermined overstretching force. As a result of the displacement of the bearing block 60a, the spacing of the holding arrangements 20a, 20b is also enlarged, and, consequently, a stretching of the sheet-like structure 100 is brought about. The enlarged spacing can be seen by referring to the position 104b of the left edge of the sheet-like structure 100.

The amount of the displacement is identified by $s_1$. The powerful stretching of the sheet-like structure 100 causes the sheet-like structure 100 to assume a highly homogeneous state, since the meshes of the sheet-like textile structure 100 are drawn apart in the Y-direction, so that unwanted yarn loops and the like are eliminated.

Figure 5:
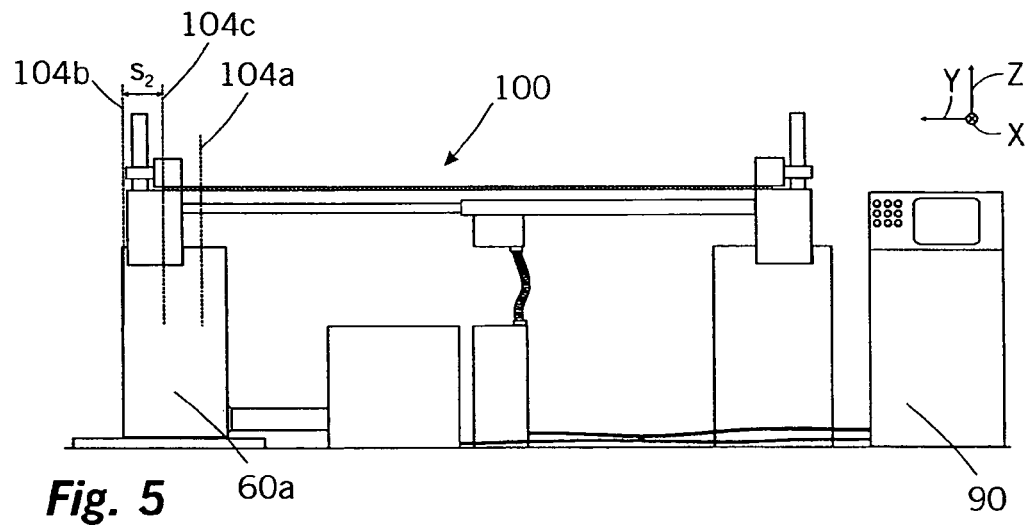
FIG. 5 shows the overall device after a pretension state has been produced in the sheet-like structure.

Starting from the overstretching state of FIG. 4, the bearing block 60a is subsequently moved back in the direction of its initial position, this movement ending when a predetermined pretensioning force $F_v$ has been applied to the sheet-like structure. The pretensioning force $F_v$ corresponds to the stretching force which should prevail in the sheet-like structure 100 in the Y-direction in the installed state. The distance $s_2$ over which the bearing block 60a is moved back between the state of FIG. 4 and the then reached state of FIG. 5 is not fixed, but depends only on when this pretensioning force $F_v$ is present in the sheet-like structure 100. As soon as this state of FIG. 5 and the accompanying position 104c of the left margin of the sheet-like structure 100 are reached, the position of the bearing block 60a is determined by the control apparatus 90, and the bearing block 60a is subsequently displaced further to the left by the amount of a predetermined relief distance $s_3$, until the left margin of the sheet-like structure has reached the position 104d. In this state, too, the sheet-like structure 100 is still under tension in the Y-direction.

Figure 6:
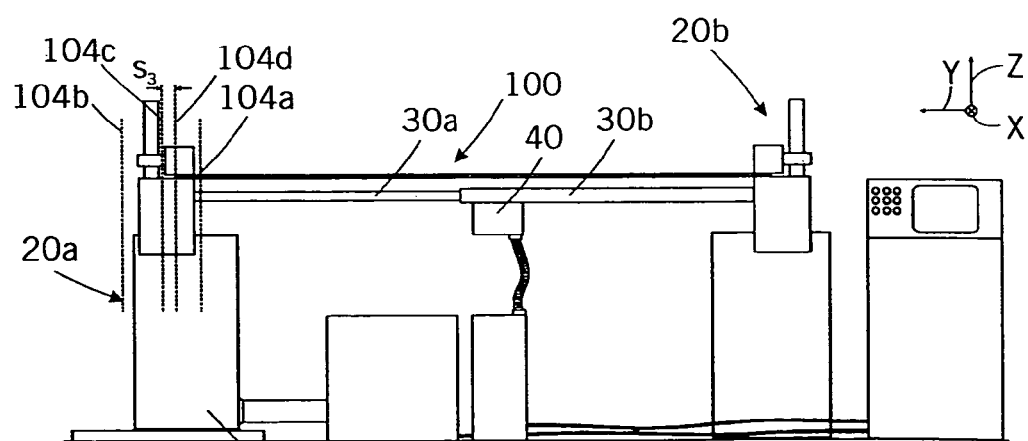
FIG. 6 shows the overall device after a detensioned pretension state has been produced and this state has been fixed.

In the relieved pretension state thereby reached, which is illustrated in FIG. 6, the air pressure prevailing at the air pressure brake 40 is lowered, with the result that the air pressure brake fixes the mutually telescopic tubes 30a, 30b of the connecting tube 30 between the holding arrangements 20a, 20b with respect to one another.

Figure 7:
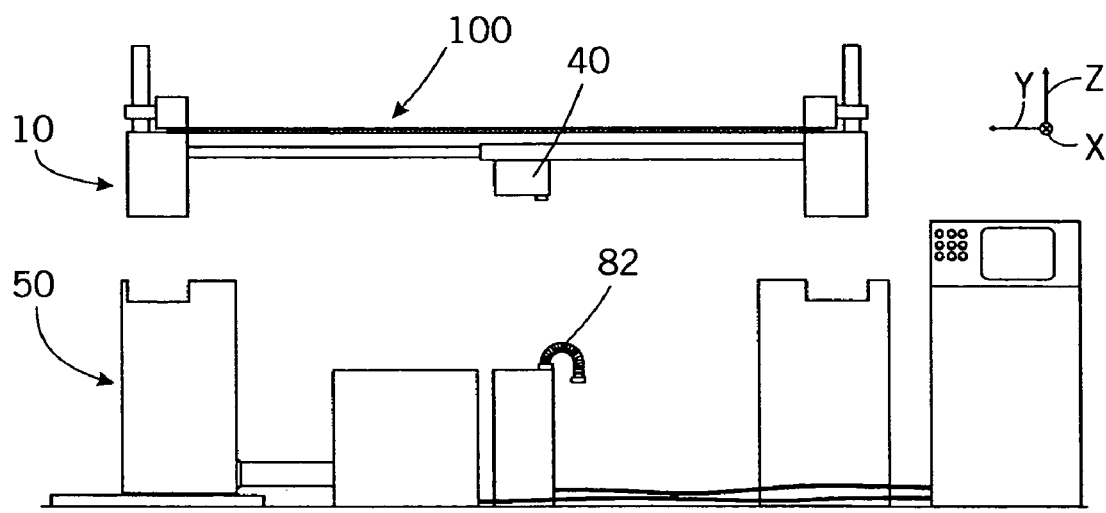
FIG. 7 shows a state after the frame subassembly has been lifted from the basic subassembly.
Figure 8:
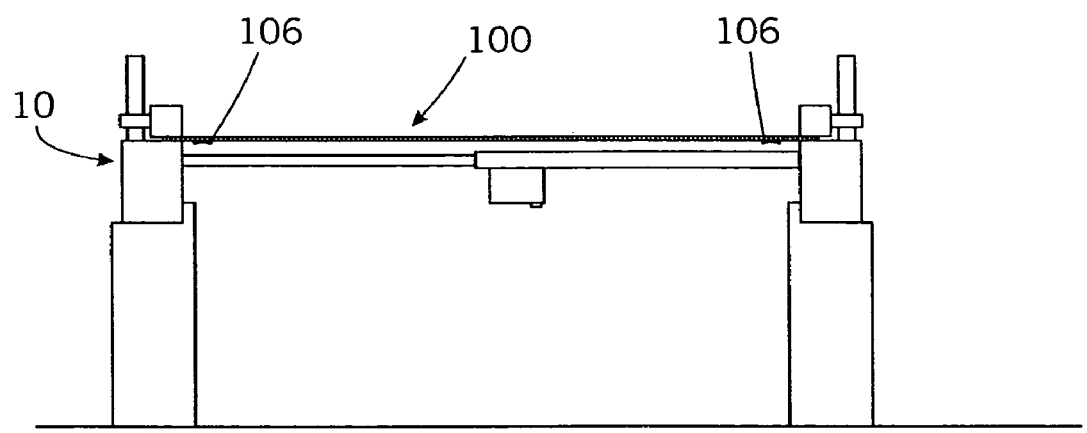
FIG. 8 shows the frame subassembly in a following workstation at which guide means are fastened to the sheet-like structure.

Subsequently, as illustrated in FIG. 7, the supply of compressed air to the braking device 40 can finally be interrupted in that the hose 82 is removed from the compressed air brake 40. The frame subassembly 10 is thereafter separated from the basic subassembly 50 again by being raised in the Z-direction. The tension-mounted sheet-like structure 100 remains in a state which is detensioned by the amount of the predetermined relief distance $s_3$ as compared with the installation state in a vehicle. This state is maintained automatically by the frame subassembly 10, since the compressed air brake 40 remains in the blocking state on account of the absence of air pressure.

For the subsequent application, in particular adhesive bonding of guide strips for guide means 106, the frame subassembly 10 is placed onto a second basic subassembly, not described in detail. The guide means 106 are attached at a spacing with respect to one another which is reduced by the amount of the relief distance $s_3$ in relation to the spacing in the installed state. Owing to the slight relief of the sheet-like structure 100, a particularly stable and resistant adhesive connection can be achieved between the sheet-like structure 100 and the guide rails 106.

The illustration of the device is to be understood as being merely a diagrammatic illustration. The sizes of the individual components, in particular the stretching dimensions of the sheet-like structure, are illustrated, disproportionately large, for the sake of clarity.

The invention claimed is:

1. A method for attaching guide means to a flexible sheet structure, comprising:
   holding regions, spaced apart from one another in a Y-direction, of a flexible sheet structure extending in an X-direction and the Y-direction, the holding regions being spaced apart from one another by being acted upon with a predetermined pretensioning force acting in the Y-direction, with the result that a pretension state is achieved,
   in a further processing state which corresponds to the pretension state or to the pretension state relieved by an amount of a predetermined relief distance in the Y-direction with respect to the pretension state, guide means extending in the X-direction and spaced apart from one another in the Y-direction are fastened to the sheet structure,
   the sheet structure, while being acted upon with the pretensioning force is held in a region of the holding regions in each case by holding means, and the holding means are part of a common holding device which can be handled separately,
   before action by the pretensioning force, the sheet structure is introduced into the holding device, and the holding means are put into a holding state, and
   the holding device is placed on a loading device designed for applying the pretensioning force.

2. The method according to claim 1, including an additional step before action by the predetermined pretensioning force:
   the flexible sheet structure is acted upon in the Y-direction with an overstretching force higher than the pretensioning force.

3. The method according to claim 1, further including:
   after the further processing state is reached, the holding device is separated from the loading device.

4. A method for attaching guide means to a flexible sheet structure, comprising:
   holding regions, spaced apart from one another in a Y-direction, of a flexible sheet structure extending in an X-direction and the Y-direction, the holding regions being spaced apart from one another by being acted upon with a predetermined pretensioning force acting in the Y-direction, with the result that a pretension state is achieved,
   in a further processing state which corresponds to the pretension state or to the pretension state relieved by an amount of a predetermined relief distance in the Y-direction with respect to the pretension state, guide means extending in the X-direction and spaced apart from one another in the Y-direction are fastened to the sheet structure, and
   after the further processing state is reached, the spacing of holding means holding the holding regions is fixed by fixing means which are different from a force applying means for reaching the pretension state.

* * * * *